US012765584B2

(12) United States Patent
Bergwerff et al.

(10) Patent No.: US 12,765,584 B2
(45) Date of Patent: Oct. 20, 2026

(54) OIL-IN-WATER EMULSION COMPRISING PLANT PROTEIN

(71) Applicant: Conopco, Inc., Englewood Cliffs, NJ (US)

(72) Inventors: Edwin Bergwerff, Wageningen (NL); Krassimir Petkov Velikov, Utrecht (NL); Robert Vreeker, Melissant (NL); Nicolaas Jan Zuidam, Amersfoort (NL)

(73) Assignee: Conopco Inc., Hoboken, NJ (US)

( * ) Notice: Subject to any disclaimer, the term of this patent is extended or adjusted under 35 U.S.C. 154(b) by 291 days.

(21) Appl. No.: 17/761,331

(22) PCT Filed: Sep. 1, 2020

(86) PCT No.: PCT/EP2020/074299

§ 371 (c)(1),
(2) Date: Mar. 17, 2022

(87) PCT Pub. No.: WO2021/058238

PCT Pub. Date: Apr. 1, 2021

(65) Prior Publication Data

US 2022/0240556 A1 Aug. 4, 2022

(30) Foreign Application Priority Data

Sep. 23, 2019 (EP) .................................... 19198832

(51) Int. Cl.

| | |
|---|---|
| ***A23L 27/60*** | (2016.01) |
| ***A23D 7/00*** | (2006.01) |
| ***A23J 1/10*** | (2006.01) |
| ***A23J 1/14*** | (2006.01) |
| ***A23J 3/10*** | (2006.01) |
| ***A23J 3/14*** | (2006.01) |

(52) U.S. Cl.
CPC .............. *A23L 27/60* (2016.08); *A23D 7/003* (2013.01); *A23J 1/14* (2013.01); *A23J 3/14* (2013.01)

(58) Field of Classification Search
CPC .......... A23L 27/60; A23L 35/10; A23L 29/10; A23J 1/14; A23J 3/14; A23D 7/003
See application file for complete search history.

(56) References Cited

U.S. PATENT DOCUMENTS

| | | | | | |
|---|---|---|---|---|---|
| 4,311,715 | A * | 1/1982 | Oka | A23L 27/60 | 426/64 |
| 4,948,617 | A * | 8/1990 | Dartey | A23L 27/60 | 426/604 |
| 5,958,498 | A * | 9/1999 | Trueck | A23L 27/66 | 426/605 |
| 7,989,017 | B2 | 8/2011 | Hiron et al. | | |
| 2004/0047974 | A1 * | 3/2004 | Campbell | A23J 3/08 | 426/605 |
| 2008/0181990 | A1 * | 7/2008 | Ledbetter | A23D 7/0053 | 426/601 |
| 2008/0226810 | A1 * | 9/2008 | Passe | A23J 1/14 | 426/431 |
| 2009/0099260 | A1 * | 4/2009 | Namal Senanayake | A23D 9/007 | 426/601 |
| 2009/0258133 | A1 * | 10/2009 | Bodor | A23L 27/60 | 426/602 |
| 2010/0136173 | A1 * | 6/2010 | Tang | A23J 1/14 | 426/63 |
| 2010/0159089 | A1 * | 6/2010 | Lis | A23L 15/25 | 426/271 |
| 2010/0216209 | A1 * | 8/2010 | Iwaoka | C12N 9/20 | 435/174 |
| 2010/0281765 | A1 * | 11/2010 | Schwartz | A23K 20/147 | 426/52 |
| 2013/0065822 | A1 * | 3/2013 | Miller | A23L 2/38 | 426/74 |
| 2013/0260008 | A1 * | 10/2013 | Bialek | A23L 27/60 | 426/602 |
| 2014/0087018 | A1 * | 3/2014 | Chang | A23L 13/424 | 426/647 |
| 2014/0113866 | A1 * | 4/2014 | Samoto | A61K 38/168 | 426/598 |
| 2014/0234521 | A1 | 8/2014 | Lim et al. | | |
| 2014/0356507 | A1 * | 12/2014 | Tetrick | A21D 2/183 | 426/654 |
| 2015/0305390 | A1 * | 10/2015 | Vrljic | A23L 27/26 | 426/574 |

(Continued)

FOREIGN PATENT DOCUMENTS

| | | |
|---|---|---|
| CN | 101033465 | 9/2007 |
| CN | 101082046 | 12/2007 |

(Continued)

OTHER PUBLICATIONS

Wolf, Alicia. The Dizzy Cook. “Egg Free Mayo.” Sep. 13, 2019. < https://thedizzycook.com/vegan-aquafaba-mayo/>. Accessed Jan. 21, 2026. (Year: 2019).*

Lu et al. Journal of the Science of Food and Agriculture. “Foaming and emulsifying properties of pea albumin fractions and partial characterisation of surface active components.” 2000. vol. 80. pp. 1964-1972. (Year: 2000).*

Alison. Loving It Vegan. “Vegan Mayonnaise, Creamy and Tangy—With Aquafaba.” Jul. 3, 2018. <https://web.archive.org/web/20190821080305/https://lovingitvegan.com/vegan-mayonnaise/>. Accessed Aug. 3, 2026. (Year: 2018).*

McVean, Ada. McGill. “What is Aquafaba?” Nov. 1, 2018. <https://www.mcgill.ca/oss/article/nutrition-you-asked/what-aquafaba>. Accessed Aug. 3, 2026. (Year: 2018).*

(Continued)

*Primary Examiner* — Ericson M Lachica
(74) *Attorney, Agent, or Firm* — Stephanie S. DelPonte

(57) ABSTRACT

Food composition in the form of an oil-in-water emulsion, comprising: •65 to 85 wt % of vegetable oil, •Water, •Plant protein in an amount of from 0.3 to 5 wt %, based on the weight of the composition, wherein more than 60 wt % of said plant protein, based on the weight of the plant protein, is plant albumin, wherein the pH of the composition is between 2 and 5.

17 Claims, No Drawings

(56) References Cited

U.S. PATENT DOCUMENTS

| | | | | |
|---|---|---|---|---|
| 2015/0368293 | A1 | 12/2015 | Barata et al. | |
| 2016/0302436 | A1* | 10/2016 | Huumonen | A23C 9/1315 |
| 2016/0316777 | A1* | 11/2016 | Köckritz-Perkiö | A23C 19/076 |
| 2017/0042204 | A1 | 2/2017 | Tetrick et al. | |
| 2017/0042834 | A1* | 2/2017 | Westphal | A61P 11/14 |
| 2017/0049140 | A1 | 2/2017 | Regismond et al. | |
| 2017/0251708 | A1* | 9/2017 | Benjamin | A23L 27/60 |
| 2017/0342132 | A1* | 11/2017 | Fraser | C12Y 499/01001 |
| 2018/0007909 | A1* | 1/2018 | Daigle | A61K 47/12 |
| 2018/0027851 | A1* | 2/2018 | Vrljic | A23L 7/109 |
| 2019/0069568 | A1 | 3/2019 | Meyer | |
| 2019/0116852 | A1 | 4/2019 | Kinkelaar et al. | |
| 2019/0254303 | A1* | 8/2019 | Shi | A23D 7/003 |
| 2019/0320697 | A1* | 10/2019 | Delhaye | A23L 29/231 |
| 2020/0288759 | A1* | 9/2020 | Maeda | A23D 7/0053 |
| 2021/0289811 | A1* | 9/2021 | Hatta | A23L 35/10 |

FOREIGN PATENT DOCUMENTS

| | | | | |
|---|---|---|---|---|
| CN | 106636205 | | 5/2017 | |
| EP | 788747 | A1 * | 8/1997 | A23J 1/20 |
| EP | 2227966 | | 9/2010 | |
| EP | 3459365 | | 3/2019 | |
| WO | WO9418944 | | 9/1994 | |
| WO | WO9742834 | | 11/1997 | |
| WO | WO2008069650 | | 6/2008 | |
| WO | WO2012089448 | | 7/2012 | |
| WO | WO2013067453 | | 5/2013 | |
| WO | WO2013092023 | | 6/2013 | |
| WO | WO-2014001016 | A1 * | 1/2014 | A23L 1/05 |
| WO | WO2014001030 | | 1/2014 | |
| WO | WO2014118449 | | 8/2014 | |
| WO | WO2015169506 | | 11/2015 | |
| WO | WO2017211635 | | 12/2017 | |
| WO | WO2018007508 | | 1/2018 | |
| WO | WO2018122607 | | 7/2018 | |
| WO | WO2018197822 | | 11/2018 | |

OTHER PUBLICATIONS

Buhl et al. Food Hydrocolloids. "Aquafaba as an egg white substitute in food foams and emulsions: Protein composition and functional behavior." vol. 96. pp. 354-364. (Year: 2019).*

Third Party Observation in EP20761855; Mar. 23, 2023.

Akintayo et al.; "Effects of NaCl, ionic strength and pH on the foaming and gelation of pigeon pea (*Cajanus cajan*) protein concentrates"; Food Chemistry; pp. 51-56; 66 (1999).

Cheung et al.; "Effect of pH and NaCl on the Emulsifying Properties of a Napin Protein Isolate"; Food Biophysics: vol. 10, pp. 30-38 (2015).

El-Adawy et al.; "Nutritional potential and functional properties of sweet and bitter lupin seed protein isolates"; Food Chemistry; vol. 74, pp. 455-462 (2001).

Julio et al.; "Chia (*Salvia hispanica*) protein fractions: characterization and emulsifying properties"; Journal of Food Measurement and Characterization; vol. 13, pp. 3318-3328 (2019).

Lu et al.; "Foaming and emulsifying properties of pea albumin fractions and partial characterisation of surface-active components": Journal of the Science of Food and Agriculture; vol. 80, pp. 1964-1972 (2000).

Singh et al.; "Characterisation and functional properties of proteins of some Indian chickpea (*Cicer arietinum*) cultivars"; J. Sci. Food Agric.; vol. 88, pp. 778-786 (2008).

Shevkani et al.; "Relationship between physicochemical and functional properties of amaranth (*Amaranthus hypochondriacus*) protein isolates"; International Journal of Food Science and Technology; vol. 49, pp. 541-550 (2014).

Oh She Glows; "Friday FAQs: My go-to protein powders, adding protein to salad, mayo ingredient substitutions, and more!"; https://ohsheglows.com/2016/06/10/friday-faqs-my-go-to-protein-powders-adding-protein-to-salad-mayo-ingredient-substitutions, 15 pages (2016).

Search Report and Written Opinion in EP19198832.8; Mar. 10, 2020; European Patent Office (EPO).

Search Report and Written Opinion in PCT/EP2020/074299; Nov. 12, 2020; World Intellectual Property Org. (WIPO).

Alderliesten, M., "Mean Particle Diameters. Part II: Standardization of nomenclature", Particle & Particle Systems Characterization, 8, pp. 237-241 (1991).

Alu'datt, M. H., et al., "Preparation of mayonnaise from etracted plant protein isolates of chickpea, broad bean and lupin flour: chemical, physochemical, nutrional and therapeutic properties", J. Food Sci Technol, 54(6), pp. 1395-1405 (2017).

ClariSoy Product description; ClariSoy Product description; 3 pages (retrieved from https://burcon.ca/products/clarisoy/).

Day, L., "Proteins from land plants—Potential sources for human nutrion and food security", Trends in Food Science & Technology, 32, pp. 25-42, (2013).

Lam, A. C. Y., et al., "Pea protein isolates: Structure, extraction and funtionality", Food Reviews International, 34(2), pp. 126-147 (2018).

Papalamprou, E., et al., "Model salad dressing emulsion stability as affected by the type of the pulin seed protein isolate", J. Sci. Food Agric., 86, pp. 1932-1937 (2006).

PeaZazz product description; 3 pages (retrieved from https://burcon.ca/products/peazazz/) .

PeaZazz Product Sheet; 2 pages (rertieved from https://burcon.ca/wp-content/uploads/2018/06/Peazazz_Product_Sheet_May2017.pdf).

Raymundo, A., et al., "White lupin protein as an ingredient to produce egg-free mayonnaise and salad dressings", Food Industry Journal, 5(4), pp. 322-329 (2002).

Sethi, P., et al., "Functional properties of protein isolate from Leucaena leucocephala seeds", International Journal of Food Sciences and Nutrition, 45(1), pp. 35-39 (1994).

Tyrsin, Y., et al., "The technology of mayonnaise and sauce based on protein isolates from chickpea", Maslozhirovaya Promyshlennost, 1, pp. 19-25 (2012).

Wastyn, M. M., et al., "Functionality of protein isolates and concentrates from pea, sunflower, rapeseed and potato"; Food Proteins: Struct. Funct., Symp. Food Proteins. Struct.-Funct. Relat, $4^{th}$ Ed., pp. 324-326 (1993).

Ma, Z. et al., "Preparation of Salad Dressing Emulsions Using Lentil, Chickpea and Pea Protein Isolates: A Response Surface Methodology Study", Journal of Food Quality, 39(4), pp. 274-291 (2016).

Cheung et al..; "The effect of pH and NaCl levels on the Physicochemical and Emulsifying Properties of a Cruciferin Protein Isolate"; Food Biophysics; pp. 105-113; 2014.

Buhl et al; "Aquafaba as an egg white substitute in food foams and emulsions: Protein composition and functional behavior"; Food Hydrocolloids; vol. 96; pp. 354-364; 2019.

Notice of Opposition in EP20761855; 24 pages; Jan. 26, 2024.

Le; Vegan Aquafaba Mayo; Viet Vegan; 8 pages; 2017.

Szulc; "Assessment of the Possibility of Using Aquafaba in the Production of Vegetalbe Emulsions"; Food Engineering; pp. 56-61; 2021.

Hanna Instruments; Acidity of Mayonnaise; 1 page.

McGlynne; "The Importance of Food pH in Commercial Canning Operations"; Food Technology Fact Sheet; Robert M. Kerr Food & Agricultural Products Center ; pp. 118.1-118.8.

Vos, "Albumin content of protease inhibitor and patatin from potato", Experimental Report; 1 page; 2024.

Frank; "Homemade Mayonnaise the Italian Way"; Memorie di Angelina; 11 pages; 2012.

Cloake; "How to make mayonnaise=receipe"; Food; 20 pages; 2018.

Widerstrom et al; "Mayonnaise: Quality and Catastrophic Phase Inversion"; Lund University; pp. 1-78; 2017.

Vegan Chickpea Mayo; V/GF; pp. 1-3.

Shim et al; "Composition and Properties of Aquafaba: Water Recovered from Commercially Canned Chickpeas"; Journal of Visualized Experiments; www.jove.com; 14 pages; 2018.

(56) References Cited

OTHER PUBLICATIONS

Lafarga et al; "Optimisation of the pH and boiling conditions needed to obtain improved foaming an emulsifying properties of chickpea Aquafaba using a response surface methodology"; IRTA; 25 pages (2019).
Harkema; "Potato Proteins: 'Free From' Texture and Nutrition"; Bridge2 Food 9th Food Proteins Course; 27 pages; 2015.
Potato Protein; Avebe; www.avebe.com products potato-protein; pp. 1-4; 2016.
Solanic; Avebe; www.avebe.com products solanic; pp. 1-4; 2017.
Kapp et al; "The foaming properties of proteins isolated from barley"; Journal of the Science of Food and Agriculture; vol. 82; pp. 1276-1281; 2002.
Sathe et al; Functional Properties of the Great Northern Bean (*Phaseolus vulgaris* L.) Proteins: Emulsion, Foaminh, Viscosity, and Gelation Properties; Journal of Food Science; vol. 46; pp. 71-81; 1981.
Sathe et al; "Solubilization and Electrophoretic Characterization of the Great Northern Bean (*Phaseolus vulgaris* L.) Proteins"; Journal of Food Science; vol. 46; pp. 82-87; 1981.
Hunt; Waste Not; "Aquafaba: The Miracle Vegan Ingredient You've Been Throwing Away"; 2 pages; 2018.
Search Report and Written Opinion in PCT/EP2020/074299; Mar. 15, 2022; World Intellectual Property Org. (WIPO).
Scaviner et al.; "Emulsifying Properties of Pea Globulins as Related to Their Adsorption Behaviors"; Journal of Food Science; vol. 52; pp. 335-341; 1987.
Horiba Scientific; "A guidebook to particle size analysis"; Horiba Instruments Inc; 32 pages; 2010.
Damodaran et al.; "Fennama's Food Chemistry Fifth Edition"; CRC Press; Taylor & Francis Group LLC; pp. 512-527; 2017.
White Paper; "Navigating the mayonnaise maze"; Taking the guesswork out of production; 21 pages; 2017.
Zanjani et al.; "Challenges and approaches for production of a healthy and functional mayonnaise sauce"; Food Science & Nutrition; Wiley; vol. 7; pp. 2471-2484; 2019.
McGee; "The Science and Lore of the Kitchen"; On Food and Cooking; pp. 578-630; 1984.
BRIDGE2FOOD; "Theory & practice for 10 plant & animal proteins"; 9th Food Proteins Course; 27 pages; 2015.
Solanic; "High performance potato protein for food applications"; Solanic 306P; www.solanic.eu; 2015.
Cloake; "How to make perfect mayonnaise"; Word of mouth blog; 7 pages; 2010.

* cited by examiner

OIL-IN-WATER EMULSION COMPRISING PLANT PROTEIN

The present invention relates to a food composition in the form of an oil-in-water emulsion comprising plant protein. It further relates to a process for preparing such food composition.

BACKGROUND

Emulsified food compositions such as mayonnaise or some salad dressings comprise water and oil. To stabilize such an emulsified food composition, an emulsifier is present.

For mayonnaise or salad dressing, the emulsifier traditionally comprises egg, in particular, egg yolk. Egg yolk provides a specific taste to the emulsified food product. Egg yolk is known to provide an emulsion that is stable upon storage and provides an attractive texture to the mayonnaise or salad dressings.

Some groups of consumers prefer to avoid eating ingredients of animal origin, including products derived from egg. Consequently, there is a need to provide an emulsified food product, in particular a mayonnaise or salad dressing that does not rely on the use of egg-derived emulsifier, while preferably showing sufficient stability upon storage.

Emulsifiers which are derived from plant proteins are known. Although stable emulsification was established by these emulsifiers, it was observed that when used in high oil emulsions (more than 65 wt % of oil), like in normal full fat mayonnaise, the texture of the product gets inhomogeneous, like a curdled texture, such as for example observed in cottage cheese.

Accordingly, a need was recognized for a stable high-oil (more than 65 wt % of oil), oil-in-water emulsion composition with a homogenous texture and appearance (not a 'curdled' appearance), which does not depend on the presence of egg-derived emulsifier for its texture and appearance but resembles as much as possible the texture and appearance of equivalent emulsions using an egg-derived emulsifier.

SUMMARY OF THE INVENTION

Surprisingly, this problem could be solved by a food composition in the form of an oil-in-water emulsion comprising:

- 65 to 85 wt % of vegetable oil,
- Water,
- Plant protein in an amount of from 0.3 to 5 wt %, based on the weight of the composition, wherein more than 60 wt % of said plant protein, based on the weight of the plant protein, is plant albumin, wherein the pH of the composition is between 2 and 5.

In a second aspect, the invention relates to a process to prepare the composition of the invention, the process comprising the step of:

- a) Preparing a water phase comprising water and plant protein in an amount of 0.3 to 5 wt %, based on the weight of the resulting food composition, wherein more than 60% of said plant protein, based on the weight of the plant protein, is plant albumin,
- b) Preparing an oil phase, comprising vegetable oil in an amount of from 65 to 85 wt % based on the weight of the resulting food composition,
- c) Mixing the water phase and the oil phase, to result in an oil-in-water emulsion.

In a third aspect, the invention relates to the use of plant protein, wherein more than 60 wt % of said plant protein, based on the weight of the plant protein, is plant albumin, in a food composition in the form of an oil-in-water emulsion with an oil content of from 65 to 85 wt %, to provide a homogenous texture to said food composition, wherein the plant protein is used in an amount of from 0.3 to 5 wt %, preferably of from 0.7 to 2.5 wt % based on the weight of the food composition.

DETAILED DESCRIPTION OF THE INVENTION

All percentages, unless otherwise stated, refer to the percentage by weight (wt %).

"Spoonable" means that a composition is semi-solid but not free-flowing on a time scale typical for eating a meal, meaning not free-flowing within a time period of an hour. A sample of such substance is able to be dipped with a spoon from a container containing the composition.

Except in the operating and comparative examples, or where otherwise explicitly indicated, all numbers in this description indicating amounts or ratios of material or conditions of reaction, physical properties of materials and/or use are to be understood as modified by the word "about".

Features described in the context of one aspect of the invention can be applied in another aspect of the invention.

The invention provides a food composition as defined in the first aspect above.

Emulsion

The composition of the invention is in the form of an oil-in-water emulsion. Examples of oil-in-water emulsions encompassed by the present invention include emulsified sauces, such as mayonnaise, and dressings, such as salad dressings and vinaigrettes. Preferably, the food composition is an emulsified sauce or dressing, preferably a mayonnaise, a salad dressing or a vinaigrette, and most preferably is a mayonnaise. Generally, a mayonnaise is spoonable, while a salad dressing or a vinaigrette is pourable. A vinaigrette traditionally is a mixture of vegetable oil and a vinegar, and may be a stable oil-in-water emulsion.

It is preferred that (after emulsifying) the emulsion is stable for more than one hour, preferably during a time period of half a year or more (like for example some mayonnaises).

Mayonnaise is generally known as a thick, creamy sauce that can be used as a condiment with other foods. Mayonnaise is a stable water-continuous emulsion of typically vegetable oil, egg yolk and either vinegar or lemon juice. In many countries the term mayonnaise may only be used in case the emulsion conforms to the "standard of identity", which defines the composition of a mayonnaise. For example, the standard of identity may define a minimum oil level, and a minimum egg yolk amount. Also, mayonnaise-like products having oil levels lower than defined in a standard of identity or not containing egg yolk can be considered to be mayonnaises in the context of the present invention. Mayonnaises may vary in colour, and are generally white, cream-coloured, or pale yellow. The texture may range from light creamy to thick. Mayonnaises in the context of the present invention do not necessarily need to conform to a standard of identity in any country.

Oil

It was observed, that at high oil levels, higher than 65 wt %, preferably higher than 70 wt %, the texture of an emulsified food composition becomes inhomogeneous, when a general plant protein isolate is used as emulsifier instead of egg-derived emulsifier such as egg yolk. The appearance of the composition resembles that of a curdled product, with an inhomogeneous texture, like for example cottage cheese. At stable oil-in-water emulsions with low oil levels this problem appears not to be present.

The present invention solves the problem of an inhomogeneous texture in an emulsified food composition comprising plant protein that occurs at high oil levels. In the present invention, the concentration of vegetable oil ranges from 65 to 85 wt %, preferably from 65% to 80%, even more preferably of from 70 to 75%, based on the weight of the composition. Any combination of ranges using these mentioned end points are considered to be part of the invention as well.

Vegetable oil is known in the art, and include oils derived from e.g. plants, such as from for example nuts or seeds from plants. In the context of this invention, 'vegetable oil' also includes oil from algae. Preferred oils for use in the context of this invention are vegetable oils which are liquid at 5° C. Preferably the oil comprises an oil selected from the group consisting of sunflower oil, rapeseed oil, olive oil, soybean oil, and combinations of these oils. Therefore, preferably the vegetable oil is an edible oil.

Water

The composition of the invention comprises water. The total amount of water is preferably of from 15 to 35%, more preferably of from 20 to 35 wt %, even more preferably of from 25 to 30 wt %, based on the weight of the composition. Any combination of ranges using these mentioned end points are considered to be part of the invention as well.

Emulsifier

The composition of the invention comprises an oil-in-water emulsifier. The emulsifier serves to disperse oil droplets in the continuous aqueous phase of an oil-in-water emulsion. According to the invention, the composition comprises plant albumin. Plant albumin is preferably albumin from pulse seeds or oil seeds or a mixture thereof. In the present invention plant protein is present in the composition in an amount of from 0.3 to 5 wt %, based on the weight of the composition, wherein more than 60 wt % of said plant protein is albumin. The plant protein is preferably selected from the group consisting of pulse protein, oil seed protein and mixtures thereof. Preferably the plant protein is pulse protein. Pulse is the family of Fabaceae. Pulse protein is preferably selected from the group consisting of pea protein, lentil protein, chickpea protein, lupin protein, *faba* bean protein, and mixtures thereof. Preferably pulse protein is selected from the group consisting of pea protein, lentil protein, chickpea protein and mixtures thereof. More preferably the pulse protein is selected from the group consisting of pea protein, lentil protein and mixtures thereof. Most preferred, the pulse protein is pea protein (*Pisum sativum*).

Oil seed protein is preferably selected from the group consisting of rape seed protein, canola protein and mixtures thereof, preferably is rape seed protein.

It was surprisingly found, that at high oil levels (more than 65 wt %) using plant protein with more than 60% of albumin as an emulsifier, rather than a total protein isolate, a significant improvement of the homogeneous texture, i.e. a smooth appearance of the oil-in-water emulsion could be achieved.

Albumin is well-known to the person skilled in the art. It can be obtained as plant protein that is present in the supernatant during typical acid precipitation step of plant proteins, as explained for example in patent US2015/0368293. Plant protein classification has recently been described by L. Day, Proteins from land plant—Potential resources for human nutrition and food security, Trends in Food Science & Technology 32, 25-42, 2013. In the present invention, plant albumin is defined as all plant protein which does not precipitate in water at room temperature (20° C.) at pH in a range of 3.0 to 5.

Plant albumin can be obtained from plants by a process known in the art, see for example US2015/0368293 or the review article by A. C. Y. Lam, A. Can Karaca, R. T. Tyler, and M. T. Nickerson, Pea protein isolates: Structure, extraction, and functionality, Foods Reviews International 34(2), 126-147, 2018. A similar process has been described in detail below in the example section. It is noteworthy, that many protocols used in the art to isolate plant protein are based on solubilization of proteins at neutral pH or slightly alkaline conditions (pH in a range of 8 to 11), followed by an acidification step at pH in a range of 3 to 5. The protein that precipitates at a low pH is mainly composed of globulins and is harvested, and the remaining liquid phase (comprising the albumin) is often discarded. The precipitated protein may then be re-dissolved or re-dispersed at neutral pH. In contrast to this, plant albumin is not isolated in this manner, as it does not precipitate at low pH. It dissolves in water at room temperature and remains present in the liquid phase during low-pH-based protein isolation methods.

An alternative process might be salt extraction, in which plant proteins are dissolved in a salt solution near neutral pH, followed by dilution with cold water to induce precipitation of the wanted protein and desalting by e.g. centrifugation and/or dialysis. Plant albumin might either be precipitate at a specific salt concentration or remain present in the liquid phase during precipitation.

The albumin used in the composition of the invention may be obtained by any suitable process, as described in the art. It might be preferred that the albumin in the composition of the invention is obtained by extraction of seed flour (preferably from ground pulse or oil seed) or plant protein with, e.g, an aqueous solution and an acid precipitation of non-albumin protein at pH 3-5, or an salt solution and precipitation upon dilution in cold water near neutral pH, preferably followed by drying, more preferably by spray drying or freeze-drying of the albumin. The albumin is preferably added in dried form.

The amount of total plant protein is preferably of between 0.3 and 5 wt %, preferably of between 0.7 and 2.5 wt %, based on the weight of the food composition (dry weight protein based on wet weight of composition including the protein), of which more than 60% of the protein weight is plant albumin (dry wt. albumin/dry wt. protein). Higher levels may result in a too thick product or show curdled appearance, whereas at lower levels the product could become too thin or instable appearance. The amount of total protein in the composition is preferably of between 0.3 and 5 wt %, preferably of between 0.7 and 2.5 wt %, based on the weight of the food composition.

The albumin is preferably present in an amount of between 0.2 and 5 wt %, more preferably of between 0.4 and 2.5 wt %, even more preferably of from 0.6 to 1.5 wt %, based on the weight of the composition (dry wt. albumin/wet wt. composition including the albumin).

The albumin is preferably albumin derived from pulse, oil seed or mixtures thereof, and said albumin preferably is present in an amount of between 0.2 and 5 wt %, more preferably of between 0.4 and 2.5 wt %, even more preferably of from 0.6 to 1.5 wt %, based on the weight of the composition. More preferably, the albumin is albumin selected from the group consisting of pea albumin, lentil albumin, chickpea albumin, lupin albumin, *faba* bean albumin, rapeseed albumin, canola albumin, and mixtures thereof, and said albumin is present in an amount of between 0.2 and 5 wt %, more preferably of between 0.4 and 2.5 wt %, even more preferably of from 0.6 to 1.5 wt %, based on the weight of the composition. Even more preferably, the albumin is albumin selected from the group consisting of pea albumin, lentil albumin, chick pea albumin and mixtures thereof, and said albumin is present in an amount of between 0.2 and 5 wt %, more preferably of between 0.4 and 2.5 wt %, even more preferably of from 0.6 to 1.5 wt %, based on the weight of the composition. Even more preferred, the albumin is albumin selected from the group consisting of pea albumin, lentil albumin and mixtures thereof, and said present in an amount of between 0.2 and 5 wt %, more preferably of between 0.4 and 2.5 wt %, even more preferably of from 0.6 to 1.5 wt %, based on the weight of the composition. Even more preferably the albumin is pea albumin, and is present in an amount of between 0.2 and 5 wt %, more preferably of between 0.4 and 2.5 wt %, even more preferably of from 0.6 to 1.5 wt %, based on the weight of the composition.

The amount of albumin, or the preferred albumin or selected albumins is more than 60 wt %, preferably from 60 to 100 wt %, even more preferably of from 80 to 100%, based on the weight of the total amount of plant protein (this is dry weight albumin based on dry weight total plant protein).

Acid and pH

The composition of the invention preferably has a pH ranging from 2 to 5, preferably ranging from 2.5 to 4.5, more preferably of from 3.0 to 4.5.

It is preferred that acid is present in the composition. Preferably the acid comprises organic acid. More preferably, the acid is organic acid. Preferably, the composition comprises an acid selected from the group consisting of acetic acid, citric acid, and mixtures thereof, most preferably, the composition comprises acetic acid. Therefore, it may be preferred that the composition comprises vinegar.

Preferably the composition of the invention has a total titratable acidity ranging from 0.03% to 3% by weight expressed as acetic acid, preferably from 0.05% to 2% by weight, preferably from 0.1% to 1% by weight. Acetic acid is preferably present in an amount of more than 50 wt %, more preferably more than 80 wt %, even more preferably more than 90 wt %, even more preferably more than 95 wt % based on the weight of the total amount of acid in the composition. It is preferred, that the organic acid, preferably the acetic acid, is added in the form of vinegar. If citric acid is present, this is preferably added in the form of lemon juice.

The acids as described in this specification include their corresponding salts which are in equilibrium with the acids (acetates, citrates). In case a concentration of an acid is provided, then this concentration refers to total concentration of the acid and its corresponding salt.

Other Ingredients

The composition of the invention preferably contains additionally other ingredients than already specifically mentioned in here. It may be preferred that the composition contains herbs and/or spices. In case such ingredients are present in the composition, then generally their total concentration is preferably at least 0.1% by weight, and preferably maximally 10% by weight, preferably maximally 5% by weight. It may be preferred that the composition comprises added flavours, more preferably oil-dissolvable flavours.

The composition of the invention may comprise sugar, preferably sucrose, but high levels are not desired. Sugar, preferably sucrose, may be present to an amount of from 0.1 to 15 wt %, preferably of from 0.3 to 6 wt %, even more preferably of from 0.4 to 5 wt %, most preferably of from 0.5 to 4 wt %, based on the weight of the composition.

Total alkaline metal salt, for example sodium chloride, may be present to an extent of from 0.1 to 5 wt %, preferably from 0.15 to 4 wt %, or more preferably of from 0.2 to 3 wt %, based on the weight of the composition.

Oil-in-water emulsions often comprise thickeners. In the present invention it was found that thickeners are not needed to provide a homogenous texture, or desired viscosity which is recognised by the consumer as resembling that of a full fat mayonnaise. Accordingly, the food composition of the invention is preferably free from starch or gum or both. The composition preferably is free from modified starch.

With the use of plant albumin, egg-derived emulsifier could be omitted, while still obtaining a smooth homogeneous texture and appearance of compositions as known from those prepared with egg-derived emulsifier. It is therefore optimally suitable to prepare a composition, such as a mayonnaise or salad dressing composition, for consumers that prefer not to eat food product comprising ingredients from animal origin. Accordingly, the composition is preferably free from proteins of animal origin. The composition is preferably free from egg-derived ingredient, more preferably free from ingredients of animal origin. "Animal origin" includes products originating from an animal itself, but also products produced by an animal, like eggs or milk, as the skilled person understands.

With the use of plant albumin a homogenous texture could be obtained. For example, such a homogenous texture is smooth and does not have a curdled appearance. The rheological properties of the composition can be expressed in elastic modulus G' (in Pa) and Stevens Value (in grams). The G' preferably is between 1000 and 4000 Pa, preferably between 1500 and 3000 Pa, as measured at 20° C. The Stevens Value (in grams) is preferably of between 50 g and 400 g, more preferably of between 100 and 200 g, and even more preferably of between 100 g and 150 g, as measured at 20° C.

The droplet size D3.2 is preferably from 0.2 to 75, more preferably of between 5 and 50 μm, most preferably of between 10 and 30 microns. see M. Alderliesten, Particle & Particle Systems Characterization 8 (1991) 237-241; for definitions of average diameters).

A preferred composition according to the invention is food composition in the form of an oil-in-water emulsion comprising:

- 70 to 80 wt % of vegetable oil,
- Water,
- Plant protein in an amount of from 0.2 to 5 wt %, based on the weight of the composition, wherein more than 60 wt % of said plant protein, based on the weight of the plant protein, is plant albumin, wherein the composition is free from animal-derived protein, starch and gum, and has a pH of between 3.0 and 4.5, and wherein the composition preferably is a mayonnaise.

Method for Preparation of Composition

The compositions of the invention are prepared by any method commonly known for preparing oil-in-water emulsions. Preferably, by using such method, an oil-in-water emulsion is prepared, wherein the oil droplets have a surface weighted mean diameter D3.2 of 0.2 to 75 micron, more preferably of less than 50 micrometer, even more preferably from 5 to 50 micrometer, even more preferably of from 10 to 30 micrometer (see M. Alderliesten, Particle & Particle Systems Characterization 8 (1991) 237-241; for definitions of average diameters).

Accordingly, in a second aspect the present invention provides a method for making an emulsified food composition according to the first aspect of the invention. Preferred compounds and amounts indicated in the first aspect of the invention apply for this aspect as well. The method comprises the steps of:

a) Providing a water phase comprising water, and plant protein in an amount of 0.3-5 wt %, based on the weight of the resulting food composition, wherein more than 60 wt % of said plant protein, based on the weight of the plant protein, is plant albumin, b) Providing an oil phase comprising 65 to 85 wt % of vegetable oil, based on the weight of the resulting composition, c) Mixing the oil phase and the water phase, to provide a food composition in the form of an oil-in-water emulsion.

Technology to prepare oil-in-water emulsions is known in the art, e.g. for mayonnaise making. Preferably, water and water-soluble ingredients are provided in step a). An acid is preferably added in step a). Acid is preferably added in the form of vinegar, citric acid or a mixture thereof, in step a). It may be preferred that also salt, sugar or a mixture thereof is be added to the water phase in step a), especially if the composition is a mayonnaise. The amount of plant protein containing more than 60% of plant albumin based on protein weight (dry wt. albumin on dry wt. plant protein) is preferably added in an amount of from 0.7 to 2.5 wt %, based on the weight of the resulting food composition, as described above in the context of the product of the invention. This is dry wt. of plant protein on wet wt. of resulting emulsion. The preferred amount of albumin in the resulting food composition, preferably of pulse or oil seed origin, or a combination thereof, is as indicated above in the content of the product description.

In step b), an oil phase is provided. The oil phase comprises vegetable oil. Oil-soluble flavour(s) can be added to the oil in step b). The preferred amounts of oil added in step b) are as indicated above in the content of the product description.

In step c), the oil phase and the water phase, comprising the plant protein, as provided in step a), are mixed to provide an oil-in-water-emulsion. Mixing results in homogenization and is suitably carried out with a shear mixing device as known in the art such as a colloid mill, rotor-stator homogenizer, or Silverson mixing apparatus.

The invention further relates to a product obtainable by, preferably obtained by a process according to the method of the invention. The resulting product preferably is a food composition in the form of an oil-in-water emulsion, comprising:

65 to 85 wt % of vegetable oil,

Water,

Plant protein in an amount of from 0.3 to 5 wt %, based on the weight of the composition, wherein more than 60 wt % of said plant protein, based on the weight of the plant protein, is plant albumin, Preferably, the G' (in Pa) in this product is between 1000 and 4000 Pa, preferably between 1500 and 3000 Pa, as measured at 20° C. Preferably, the composition is free from starch or gum or from both. Preferably, the droplet size D3.2 is between 0.2 to 75 μm.

Use

The invention further relates to the use of plant protein, wherein more than 60 wt % of said plant protein, based on the weight of the plant protein, is plant albumin, in a food composition in the form of an oil-in-water emulsion with an oil content of from 65 to 85 wt %, to provide a homogenous texture to said food composition, wherein the plant protein is used in an amount of from 0.3 to 5 wt %, preferably of from 0.7 to 2.5 wt % based on the weight of the food composition.

The composition is preferably fee from starch and gums. The composition is preferably free from egg-derived emulsifier. Preferably, the Stevens value of the texture is from 50 g to 400 g, more preferably of from 50 to 200 g, even more preferably of from 100 g to 150 g, as measured at 20° C.

Methods Used:

Rheology

Rheological properties (dynamic moduli and viscosity) were measured using an AR2000ex rheometer (TA Instruments Ltd, UK). The rheometer was equipped with parallel plates (4 cm diameter) with roughened surfaces and a measurement gap of 1 mm. Dynamic moduli (G', G") and tan δ (=G"/G') were determined from oscillatory measurements performed at 1 Hz frequency; Strain was set at 0.01%, and temperature at 20° C. G' was recorded after 5 minutes.

Stevens Values

Firmness (or Hardness or Stevens value: SV) was determined using a Stevens Texture Analyser equipped with a typical mayonnaise grid, speed 1 mm/s, depth 20 mm, at room temperature. The mayonnaise grid comprises square openings of approximately 3×3 mm, consisting of wire with a thickness of approximately 1 mm, diameter of the circular grid is 37.4 mm.

EXAMPLES

The invention is now exemplified by the following, non-limiting, examples.

Example 1

This example illustrates an extraction process of a pea albumin. This may also be used for other plant albumins.

Yellow pea flour (Vlaardingen mill, local supplier, The Netherlands) was added to spirit vinegar (12%) and demineralised water in the amounts as shown in Table 1, and the pH was 4.1. This dispersion was slowly agitated for 1 h at room temperature and then centrifuged for 30 min at 10,000 g. The obtained supernatant was filtered through a 25 micrometer cloth (Micacloth, Calbiochem), heated for 5 min at 85° C. for microbiological stability reason and then freeze-dried. The protein content of the obtained powder was 53.1 wt. % as determined by measuring the total nitrogen content using the DUMAS method, generally known in in the art and in more detail described in e.g. the standard ISO 16634-1:2008, and a conversion factor of 6.25 conversion. The protein resulting from the process is substantially albumin.

TABLE 1

Composition of extraction medium for pea albumin

| Ingredient | Amount (grams) |
|---|---|
| Yellow pea flour | 750 |
| Spirit vinegar (12%) | 390 |
| Water | 1860 |
| Total | 3000 |

Example 2 (According to the Invention)

A mayonnaise containing 70% of oil and pea albumin as an emulsifier was prepared on the basis of the recipe shown in Table 2. The protein content of this food product was 0.98%.

TABLE 2

Composition of mayonnaise with pea albumin

| Ingredient | Amount (grams) | Wt. % |
|---|---|---|
| Soybean oil | 418.6 | 69.8 |
| Pea albumin powder (example 1) | 11.56 | 1.9 |
| Water | 131.0 | 21.8 |
| Salt (NaCl) | 8.4 | 1.4 |
| Sucrose | 16.38 | 2.7 |
| EDTA | 0.042 | 0.007 |
| Sorbic acid | 0.54 | 0.09 |
| Spirit vinegar (12%) | 10.98 | 1.83 |
| Mustard oil | 1.44 | 0.24 |
| Lemon juice concentrate | 0.888 | 0.15 |
| Water-soluble flavours | 0.221 | 0.04 |
| Total | 600 | 100 |

The mayonnaise was prepared by the following procedure:

All ingredients except soybean oil and mustard oil were dissolved in water.

This mixture was heated for 5 min at 85-90° C. in a water bath, using a paddle to prevent cooking onto base and sides.

Re-weighted to determine water loss and compensate by addition water

Cooled to 30-40° C.

Mix soybean oil and mustard oil together and slowly add this to the aqueous mixture while mixing with Silverson at 7000 (no head attachment)

The obtained mayonnaise product had a pH of 3.9. The texture was smooth and homogenous. The product had an appearance similar to that of commercial mayonnaise. Its Stevens value was 61 g.

Example 3 (Comparative Example)

This example describes the results when a mayonnaise product is made with a conventional pea protein isolate (Nutralys S85F, ex Roquette, France; its protein content is 80% as specified by the supplier), which is mostly globulin.

A mayonnaise containing 70% of oil and pea protein isolate as an emulsifier was prepared on the basis of the recipe shown in Table 3. The protein content of this food product was 1.0%. In contrast to the procedure described in Example 2, the acidification could only be done here after the emulsification step, as else the pea protein isolate would precipitate immediately, due to the presence of globulin.

TABLE 3

Composition of mayonnaise with pea albumin

| Ingredient | Amount (grams) | Wt. % |
|---|---|---|
| Soybean oil | 418.6 | 69.8 |
| Pea protein isolate | 7.5 | 1.25 |
| Water | 135.0 | 22.5 |
| Salt (NaCl) | 8.4 | 1.4 |
| Sucrose | 16.38 | 2.7 |
| EDTA | 0.042 | 0.007 |
| Sorbic acid | 0.54 | 0.09 |
| Spirit vinegar (12%) | 10.98 | 1.83 |
| Mustard oil | 1.44 | 0.24 |
| Lemon juice concentrate | 0.888 | 0.15 |
| Water-soluble flavours | 0.221 | 0.04 |
| Total | 600 | 100 |

The mayonnaise was prepared by the following procedure:

All ingredients except soybean, mustard oil, vinegar and lemon juice concentrate were dissolved in water This mixture was heated for 5 min at 85-90° C. in a water bath, using a paddle to prevent cooking onto base and sides.

Re-weighted to determine water loss and compensate by addition water

Cooled to 30-40° C.

Mix soybean oil and mustard oil together and slowly added this to the aqueous mixture while mixing with Silverson at 7000 (no head attachment)

Vinegar and lemon juice were added together and gently mixed with a spoon through the obtained emulsion.

The obtained mayonnaise product had a pH of 3.9. The Stevens value was 240 g. The mayonnaise had a curdled appearance, resembling that of cottage cheese.

The invention claimed is:

1. A food composition comprising:

65 to 85 wt % of vegetable oil, water, and a plant protein in an amount of from 0.3 to 5 wt %, based on the weight of the food composition, wherein from 80 to 100 wt % of the plant protein, based on the weight of the plant protein, is plant albumin, wherein the food composition is free from starch or gum, wherein the pH of the food composition is between 2 and 5, wherein the food composition is an oil in water emulsion, and wherein the food composition is free from egg-derived ingredient.

2. The food composition according to claim 1, wherein the plant protein is selected from pulse protein, oil seed protein and mixtures thereof.

3. The food composition according to claim 1, wherein the plant protein is selected from pea protein, lentil protein, chickpea protein, lupin protein, *faba* protein, rapeseed protein, canola protein and mixtures thereof.

4. The food composition according to claim 1, wherein the plant protein is selected from pea protein, lentil protein, chickpea protein and mixtures thereof.

5. The food composition according to claim 1, wherein the plant protein is pea protein.

6. The food composition according to claim 1, wherein the amount of plant protein is of between 0.7 and 2.5 wt %, based on the weight of the food composition.

7. The food composition according to claim 1, wherein the pH of the food composition is of between 2.5 and 4.5.

8. The food composition according to claim 1, wherein the plant albumin is present in an amount of from 0.2 to 5 wt %, based on the weight of the food composition.

9. The food composition according to claim 1, wherein the Stevens Value (in grams) is between 50 g and 400 g, as measured at 20° C., using a Stevens texture analyser, speed 1 mm/s, depth 20 mm, and a grid with diameter 37.4 mm, 3×3 mm openings.

10. The food composition according to claim 1, wherein the food composition is free from animal-derived ingredients.

11. The food composition according to claim 1, wherein the food composition is a mayonnaise or a salad dressing.

12. The food composition according to claim 1, wherein the amount of plant protein is of between 0.9 and 1.5 wt %, based on the weight of the food composition.

13. The food composition according to claim 1, wherein the pH of the food composition is of between 3.0 and 4.5.

14. The food composition according to claim 1, wherein the plant albumin is present in an amount of from 0.4 to 2.5 wt %, based on the weight of the food composition.

15. The food composition according to claim 1, wherein the plant albumin is present in an amount of from 0.6 to 1.5 wt %, based on the weight of the food composition.

16. The food composition according to claim 1, wherein the plant protein is substantially free of globulins.

17. A food composition comprising:

65 to 85 wt % of vegetable oil comprising at least one of a sunflower oil, a rapeseed oil, an olive oil, and a soybean oil, water, and a plant protein in an amount of from 0.3 to 5 wt %, based on the weight of the food composition, wherein from 80 to 100 wt % of the plant protein, based on the weight of the plant protein, is plant albumin, wherein the food composition is free from starch and gum, wherein the pH of the food composition is between 2 and 5, wherein the food composition is an oil in water emulsion, and wherein the food composition is free from egg-derived ingredient.

* * * * *